Aug. 6, 1968   T. C. ROOKLIDGE   3,395,485
CROP PROTECTING PLASTIC DISPENSING MECHANISM
Filed Oct. 31, 1966   2 Sheets-Sheet 2
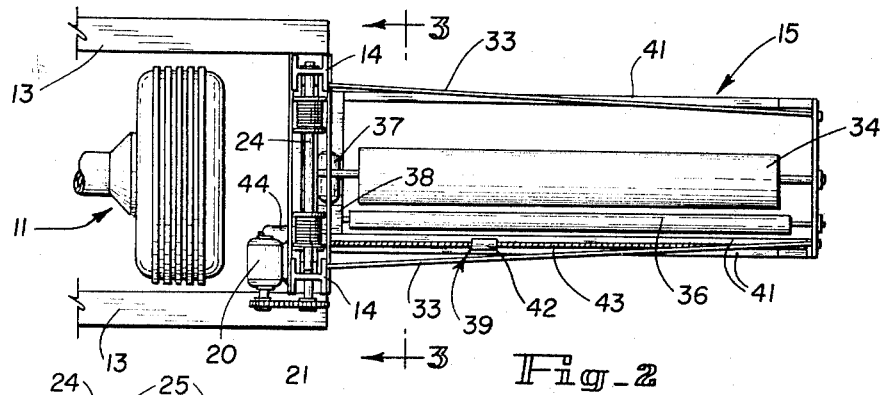
Fig-2
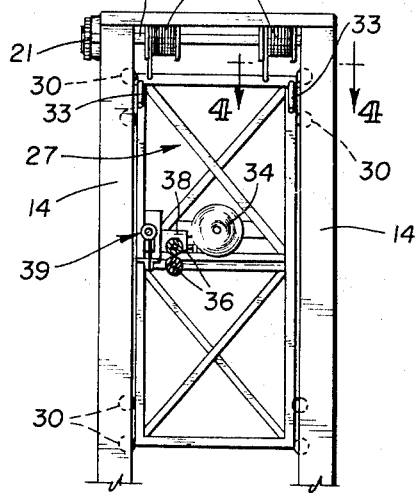
Fig-3
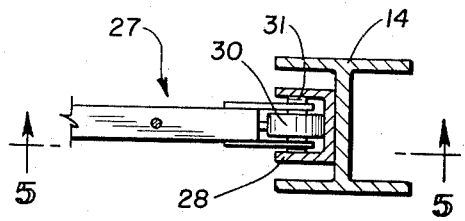
Fig-4
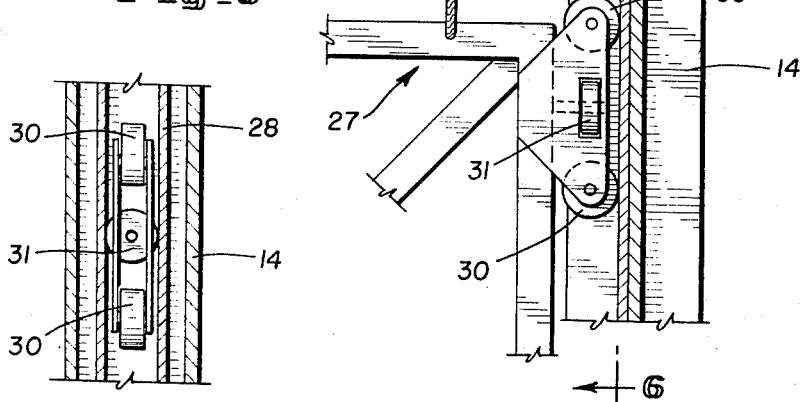
Fig-6   Fig-5
INVENTOR.
THOMAS C. ROOKLIDGE
BY
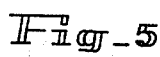
ATTORNEY

United States Patent Office 3,395,485
Patented Aug. 6, 1968

3,395,485
CROP PROTECTING PLASTIC DISPENSING MECHANISM
Thomas C. Rooklidge, 6051 Hoyt St., Arvada, Colo. 80002
Filed Oct. 31, 1966, Ser. No. 596,040
1 Claim. (Cl. 47—20)

ABSTRACT OF THE DISCLOSURE

This invention relates to a vehicle-supported dispensing mechanism which dispenses an adhesive plastic sheet material over fruits and vegetables in order to minimize frost damage thereto.

Brief summary of the invention

Figure 1:
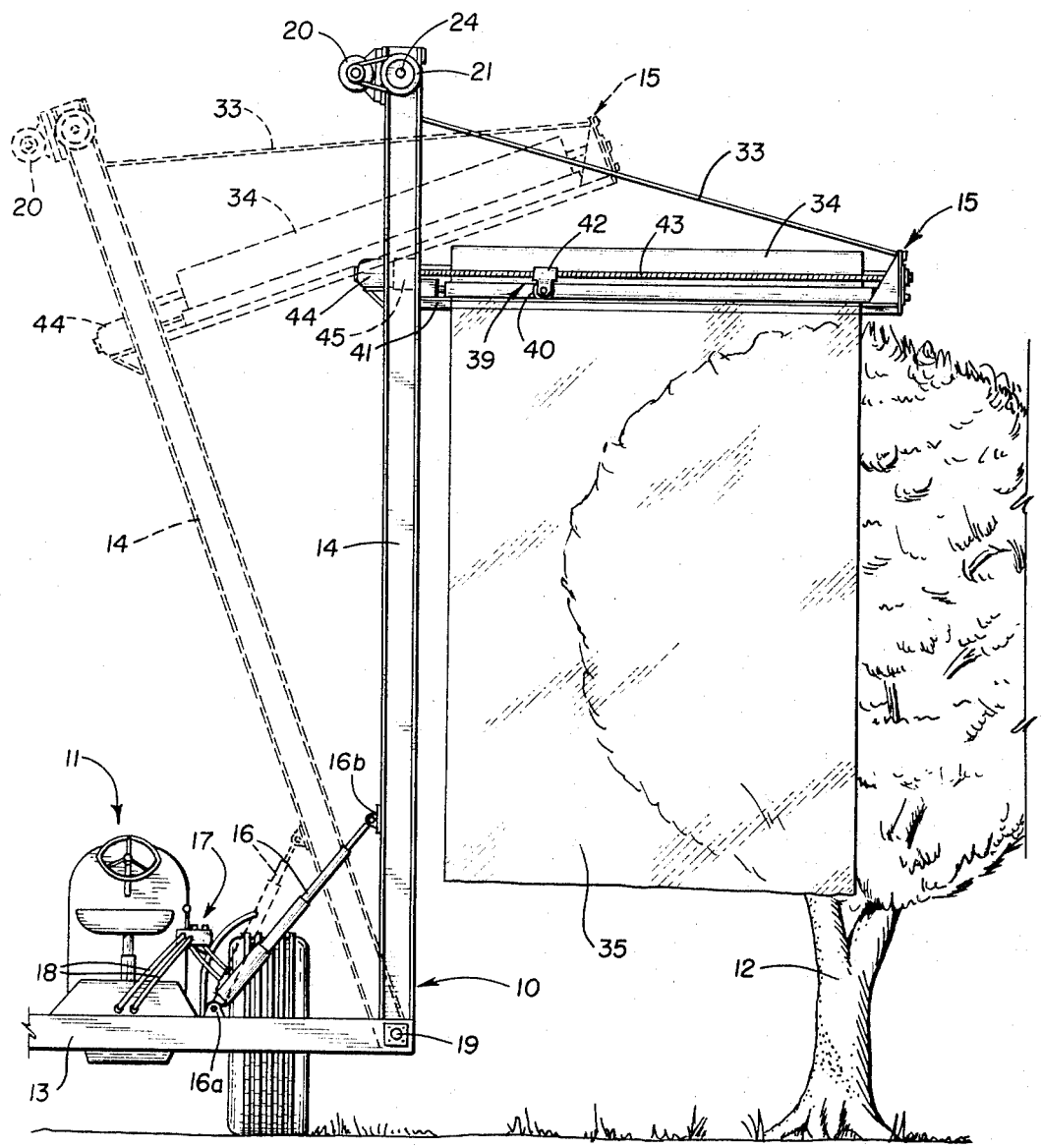

The purpose here involved is to prevent the damage that often occurs to budding fruits and other crops when a late spring frost hits and destroys the blossoms or other early growth. This invention is a machine which attaches to a tractor or other suitable carrying means and, working from the power take off supply of that unit, rapidly dispenses from a roller a thin layer of adhesive coated plastic and spreads it over the tops of the fruit trees; thus protecting them from what would otherwise be a killing frost.

Brief description of the several drawing views

FIGURE 1, side elevation of mechanism as mounted on tractor or other suitable carrying means.
FIGURE 2, top view of mechanism.
FIGURE 3, sectional view as shown by 3—3 in FIGURE 2.
FIGURE 4, sectional view of vertical framework as shown by 4—4 on FIGURE 3.
FIGURE 5, side view of the elevating member taken along line 5—5 of FIGURE 4.
FIGURE 6, frontal view of elevating member as shown by 6—6 on FIGURE 5.

The numerals appearing on the drawings and their respective word descriptions are, in brief, as follows:
10. Tree covering mechanism as a whole
11. Tractor
12. Tree
13. Framework attached to tractor
14. Upright member
15. Elevating member as a whole
16. Hydraulic tilting member with pivotal brackets 16a and b
17. Control panel
18. Hydraulic lines from tractor and into 16.
19. Pivot point
20. Motor
21. Pulley
24. Drum carrying rod
25. Elevating drums
26. Cables
27. Supporting framework for 15
28. Inner channel of 14
29. Wheel assembly of 15
30. Vertical stabilizing wheels
31. Horizontal stabilizing wheels
Referring to part 15
33. Supporting rod
34. Roll of plastic
35. Plastic with adhesive coated underside
36. Rollers run by
37. Motor
38. Gear reducer
39. Cutting means as a whole The cutting means shown would have
40. Cutting wheel adjusted to run between two of
41. The supporting members of 15 and driven by means of a
42. Holding barrel threaded to travel on a
43. Gearing rod, driven by a
44. Reversible motor thru
45. Gearbox, and controlled by limit switches (not shown).

Detailed description

This machine is conceived as an attachment that can quickly and easily be mounted on an ordinary piece of farm equipment, such as a tractor or a jeep, at the first warning of a late frost that might severely injure a then blossom-stage fruit crop (or early stage vegetable crop). After mounting on the tractor, the upright member 14 is placed at the proper angle and the elevating member 15 is raised to proper height to enable the then elevated member to barely scan the tops of a row of fruit trees as the tractor is driven down the clear space between the rows. The height and angle of the respective members can, of course, be adjusted for individual variations of particular trees within a row.

As the mechanism is thus moving along between the rows of fruit trees, the operator can switch on the motor 37 which will begin to dispense a thin layer of plastic 35 from a large roll of such 34 through rollers 36 and down over the end of the first tree in the row 12 and over the tops and sides of all the remaining trees in the row until the entire row is covered. At that point the cutting wheel 40 would cut the plastic already dispensed from the remainder of the roll. The plastic itself would already have on it when it left the roll an adhesive quality to its lower side that would hold it in place on the tops and sides of the fruit trees. The above outlined steps would then be repeated on the opposite side of the same row of fruit trees and on the other rows of trees within the same frost threatened orchard. Thus an entire orchard could be protected by adhesive coated plastic wrapping, in effect, of all of the trees involved within a few hours and well within the usual time available between the announcing of frost warnings and the actual occurrence of the frost danger to the crops. After the frost danger has completely passed, the plastic could then be removed without any great difficulty and with no pressuring time element involved.

I claim:
1. Mechanism for applying a protective sheet over plants, comprising a vehicle with a first frame member supported thereon, a second frame member pivotally connected to said first frame member and extending thereabove, telescoping tilting means on said vehicle and attached to said second member and adapted to raise and lower the same with respect to said first member about said pivotal connection, dispensing means slidably carried by said second member and adapted to traverse the same, said dispensing means including a supporting rod with a roll of sheet material thereon and cutting means adjacent thereto.

References Cited

UNITED STATES PATENTS

| | | | |
|---|---|---|---|
| 916,762 | 3/1909 | McFadden | 47—21 |
| 1,611,271 | 12/1926 | Hammond et al. | 47—20 |
| 1,732,191 | 10/1929 | Evans | 47—21 |
| 1,757,276 | 5/1930 | Vaughn | 47—21 |
| 1,957,994 | 5/1934 | Eccher | 47—20 |
| 3,228,144 | 1/1966 | Homan | 47—1 |

ROBERT E. BAGWILL, *Primary Examiner.*